US009655162B2

United States Patent
Boström et al.

(10) Patent No.: US 9,655,162 B2
(45) Date of Patent: May 16, 2017

(54) SYSTEM AND METHOD FOR SUPPORTING SWITCHING BETWEEN A PACKET-SWITCHED NETWORK AND A CIRCUIT-SWITCHED NETWORK

(71) Applicant: Telefonaktiebolaget L M Ericsson (publ), Stockholm (SE)

(72) Inventors: Lisa Boström, Solna (SE); Carola Faronius, Järfälla (SE); Alexander Langereis, Sigtuna (SE); Walter Müller, Upplands Väsby (SE); Eric Parsons, Stittsville (CA); Christian Skärby, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 179 days.

(21) Appl. No.: 14/385,512

(22) PCT Filed: Mar. 20, 2013

(86) PCT No.: PCT/IB2013/052187
§ 371 (c)(1),
(2) Date: Sep. 16, 2014

(87) PCT Pub. No.: WO2013/140343
PCT Pub. Date: Sep. 26, 2013

(65) Prior Publication Data
US 2015/0029980 A1    Jan. 29, 2015

Related U.S. Application Data

(60) Provisional application No. 61/614,348, filed on Mar. 22, 2012, provisional application No. 61/649,765, filed on May 21, 2012.

(51) Int. Cl.
H04W 76/04    (2009.01)
H04W 76/02    (2009.01)
(Continued)

(52) U.S. Cl.
CPC ........ *H04W 76/046* (2013.01); *H04B 1/0053* (2013.01); *H04W 68/12* (2013.01);
(Continued)

(58) Field of Classification Search
CPC ............... H04W 76/046; H04W 68/12; H04W 72/0413; H04W 76/026; H04W 76/045; H04B 1/0053
See application file for complete search history.

(56) References Cited

U.S. PATENT DOCUMENTS 9,084,262 B2 *   7/2015  Chin ................... H04W 76/048
2002/0122401 A1   9/2002  Xiang et al.
(Continued)

FOREIGN PATENT DOCUMENTS

WO          0167794 A1    9/2001
WO    WO 2007050733 A1 *  5/2007  ........... H04L 1/0026
(Continued)

OTHER PUBLICATIONS

European Telecommunications Standards Institute, "LTE; Evolved Universal Terrestrial Radio Access (E-UTRA); Medium Access Control (MAC) protocol specification (3GPP TS 36.321 version 10.5.0 Release 10)", Technical Specification, ETSI TS 136 321 V10.5.0, Mar. 1, 2012, pp. 1-56, ETSI.
(Continued)

*Primary Examiner* — Chi H Pham
*Assistant Examiner* — Weibin Huang
(74) *Attorney, Agent, or Firm* — Coats & Bennett, PLLC

(57) ABSTRACT

A User Equipment (UE) has multiple transceivers, each having a corresponding receiver configured to communicate on respective carriers. The UE monitors a radio access network (RAN) on a serving cell using a first of the receivers, and indicates to the base station that at least one of its receivers will temporary tune-out from the RAN. The
(Continued)

base station receives the indication from the UE, and temporarily suspends communications with the UE.

26 Claims, 11 Drawing Sheets

(51) Int. Cl.
*H04B 1/00* (2006.01)
*H04W 72/04* (2009.01)
*H04W 68/12* (2009.01)
*H04W 88/06* (2009.01)
*H04W 92/10* (2009.01)

(52) U.S. Cl.
CPC ..... *H04W 72/0413* (2013.01); *H04W 76/026* (2013.01); *H04W 76/045* (2013.01); *H04W 88/06* (2013.01); *H04W 92/10* (2013.01)

(56) References Cited

U.S. PATENT DOCUMENTS

| | | |
|---|---|---|
| 2003/0118136 A1 | 6/2003 | Tiedemann, Jr. et al. |
| 2009/0046667 A1 | 2/2009 | Pelletier et al. |
| 2009/0239533 A1* | 9/2009 | Somasundaram ... H04J 11/0093 455/434 |
| 2010/0267339 A1 | 10/2010 | Lin et al. |
| 2011/0059739 A1 | 3/2011 | Huang |
| 2011/0092198 A1* | 4/2011 | Miyata ............. H04W 36/0022 455/422.1 |
| 2011/0261763 A1 | 10/2011 | Chun et al. |
| 2012/0020310 A1* | 1/2012 | Ji .......................... H04W 48/16 370/329 |
| 2013/0039339 A1 | 2/2013 | Rayavarapu et al. |
| 2013/0242735 A1 | 9/2013 | Koc et al. |
| 2013/0242831 A1 | 9/2013 | Vannithamby et al. |
| 2014/0211699 A1* | 7/2014 | Zhou .................... H04W 48/12 370/329 |

FOREIGN PATENT DOCUMENTS

| | | |
|---|---|---|
| WO | 2011118997 A2 | 9/2011 |
| WO | 2013012371 A1 | 1/2013 |
| WO | 2013141804 A1 | 9/2013 |

OTHER PUBLICATIONS

Qualcomm Incorporated, "Dynamic activation and de-activation of secondary cells during carrier", 3GPP TSG-RAN WG2 #77, Dresden, Germany, Feb. 6, 2012, pp. 1-4, R2-120306, 3GPP.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", Technical Specification, 3GPP TS 36.300 V10.3.0, Mar. 1, 2011, pp. 1-197, 3GPP, France.

* cited by examiner

| FN+ | | | | SFN | | | |
|---|---|---|---|---|---|---|---|
| SFN | | | | | | | |
| SF | | | | TYPE | | | |
| R | R | R | R | R | SCI | | |
| $C_7$ | $C_6$ | $C_5$ | $C_4$ | $C_3$ | $C_2$ | $C_1$ | P |

*FIG. 3*

| FN+ | | | | SFN | | | |
|---|---|---|---|---|---|---|---|
| SFN | | | | | | | |
| SF | | | | TYPE | | $C_7$ | $C_6$ |
| $C_5$ | $C_4$ | $C_3$ | $C_2$ | $C_1$ | SCI | | |

*FIG. 4*

SYSTEM AND METHOD FOR SUPPORTING SWITCHING BETWEEN A PACKET-SWITCHED NETWORK AND A CIRCUIT-SWITCHED NETWORK

RELATED APPLICATIONS

This application claims priority from U.S. Provisional Application Ser. No. 61/612,935 entitled "System and Method for Supporting Switching Between a Packet-Switched Network and a Circuit-Switched Network," filed Mar. 19, 2012, and from U.S. Provisional Application Ser. No. 61/614,348 entitled "System and Method for Supporting Switching Between a Packet-Switched Network and a Circuit-Switched Network," filed Mar. 22, 2012, and from U.S. Provisional Application Ser. No. 61/649,765 entitled "System and Method for Supporting Switching Between a Packet-Switched Network and a Circuit-Switched Network," filed May 21, 2012. Each of the '935, '348, and '765 provisional applications are incorporated herein by reference in their entirety.

FIELD OF THE INVENTION

The present invention relates generally to the operation of User Equipment (UE) in a wireless communication network, and more particularly to a system and procedure for controlling communications between the UE and a base station in a radio access network (RAN).

BACKGROUND

Cellular networks were originally developed to provide primarily voice services over circuit switched (CS) networks. However, the introduction of packet switched (PS) networks enables network operators to provide data services as well as voice services to users. Eventually, network architecture is expected to evolve toward all-IP networks capable of providing both voice and data services.

Currently, some UEs implement functionality that allows them to transition from communicating with a PS network, e.g., via an LTE network, to communicating with a CS network, e.g., via IS95/CDMA network. To accomplish this, the UEs enter an idle mode with respect to the CS network after registering with the CS network, and begin communicating over the PS network. While the UE is in the CS network idle mode, the CS network may provide the UE with services notifications. For example, the CS network may alert the UE to an incoming call. Additionally, the UE may autonomously transition from the PS network to the CS network for a short period of time to perform some function associated with a CS network idle mode, or more specifically, some function associated with the Radio Resource Control (RRC) idle mode associated with the RAN that connects the UE to the CS network, such as to read a paging channel, check paging notifications for incoming calls, or perform a location update procedure. Once the CS operations are complete, the UE returns to the CS network idle mode and transitions back to communicating in the PS network.

Some UEs have two or more receivers, and thus, can maintain connections to both the CS and PS networks. However, not all UEs can establish and maintain two different connections. Particularly, some UEs have only a single transceiver, and thus, must temporarily "tune-out" of one network, e.g., the PS network, to communicate with the other, e.g., the CS network. For a UE, "tuning out" of the PS network can be problematic, particularly if there is data in the downlink buffers. More specifically, a UE would have to tune-out of the PS network for up to two seconds to perform a task, and therefore would risk being dropped by the PS network.

Those UEs having dual receivers, however, may be simultaneously connected to both an LTE network for PS services, and a CS network, e.g., a CDMA 1XRTT network, for CS services. This may be accomplished using a first receiver chain in the UE to monitor the LTE network, or the PS network via the LTE network, and a second receiver chain in the UE to monitor the CS network. With dual receivers, a UE in idle mode in both the LTE/PS and CS networks is able to perform idle mode cell reselection and page monitoring independently in both networks at the same time. Thus, a UE having dual receivers functions more or less as one LTE UE and one CDMA UE combined together.

However, when the UE is operating in Carrier Aggregation (CA) mode in the PS network, i.e., the UE is configured with one or more secondary serving cells, the UE may not be able to simultaneously monitor the CS network and all of its serving cells, i.e., its Primary serving Cell (PCell) and Secondary serving Cells (SCells), in the PS network. In such cases, the second receiver chain of the UE would have to be shared between the CS network and the one or more secondary serving cells also using the receiver. The UE would therefore need to "tune-out" on one or more secondary serving cells of the PS network in order to perform a task in the CS network.

A UE having dual receivers may perform an LTE access upon being paged by the CS network. The access serves to inform the LTE network of the page received from the CS network, and that the UE may be unreachable by the LTE network while it is connected to the CS network. One method for performing this access function is defined in chapter 10.3 of version 10.3.0 of the Third Generation Partnership Project (3GPP) Technical Specification (TS) 36.300 entitled, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," published March 2011.

Although both single and multiple transceiver UEs can "tune-out" of a network, conventional methods do not define a solution that functions for both types of UEs—i.e., single transceiver and dual or multiple transceiver UEs. For example, one potential solution for dealing with the problems associated with tuning-out of a secondary cell is provided in 3GPP TSG-RAN WG2 #77 R2-120306. The solution defined therein, however, is for dual-transceiver UEs and does not consider situations in which the UE tunes-out completely, such as would be the case of a single receiver UE tuning out of a Primary Cell (PCell), also denoted Primary serving Cell, in a non-carrier aggregation (CA) configuration. This means that two separate solutions are needed—one solution for CA configured UEs, and another solution for non-CA configured UEs.

SUMMARY

Embodiments of the present invention provides a system and method that permits User Equipment (UE) to initiate a "tune-out" procedure by signaling the intention to "tune-out" to a base station in a Radio Access Network (RAN) connected to a packet switched (PS) network. As used herein, to "tune-out" of a network means that a UE transitions away, e.g., temporarily, from communicating with one network, e.g., a PS network, to perform some function, such as to communicate signals and/or data with a different network, e.g., a CS network, or to perform some other function that would allow the UE to benefit from such a "tune-out." Such functions include, but are not limited to, functions that would allow the UE to reduce its draw on battery resources, for example.

In one embodiment, for example, the present invention provides a method for controlling communications between the UE and a base station in a RAN. In this embodiment, the UE comprises first and second transceivers, each having a corresponding receiver. The UE is also configured with one or more serving cells for communicating with the RAN. The UE monitors the RAN on a specific serving cell of the one or more serving cells using a first receiver of the first and second transceivers, and indicates, to the base station, a temporary tune-out from the RAN on at least one of the first receiver and a second receiver of the first and second transceivers.

In one embodiment, a corresponding UE is provided comprising a communication interface and a programmable controller. The communication interface comprises a plurality of transceivers. Each transceiver comprises a corresponding receiver and is configured to communicate with the RAN via the base station. The programmable controller is operatively connected to the plurality of transceivers, and in one embodiment, is configured to monitor the RAN on a specific serving cell of the one or more serving cells using a first receiver of the first and second transceivers, and indicate to the base station in the RAN a temporary tune-out from the RAN on at least one of the first receiver and a second receiver of the first and second transceivers.

In another embodiment, the disclosure provides a method for controlling communications between a UE and a base station in a RAN. This embodiment, however, is performed at the base station. Particularly, in this embodiment, the base station configures the UE with one or more serving cells for communicating with the RAN. Then, the base station receives, from the UE, an indication that at least one of a first receiver of the UE monitoring a specific serving cell of the one or more serving cells, and a second receiver of the UE, will temporarily tune-out from the RAN.

In another embodiment, the present disclosure also provides a base station, such as an eNB, for example, configured to control communications between the UE and the base station. In this embodiment, the base station comprises a communication interface and a programmable controller operatively connected to the communication interface. The programmable controller configures the UE with one or more serving cells for communicating with the RAN, and receives, from the UE, an indication that at least one of a first receiver of the UE monitoring a specific serving cell of the one or more serving cells, and a second receiver of the UE, will temporarily tune-out from the RAN.

In one or more embodiments, the base station or eNB may configure the UE to send indications with information indicating when and/or how often the UE will tune-out on one or more serving cells of the UE.

Of course, those skilled in the art will appreciate that the present invention is not limited to the above contexts or examples, and will recognize additional features and advantages upon reading the following detailed description and upon viewing the accompanying drawings.

BRIEF DESCRIPTION OF THE DRAWINGS

FIG. 3 illustrates a Media Access Control (MAC) Control Element (CE) implementation of a tune-out message configured according to one embodiment.

FIG. 4 illustrates a MAC CE implementation of a tune-out message configured according to another embodiment.

DETAILED DESCRIPTION

Embodiments of the present invention provide a system and method by which a UE having multiple transceivers can indicate its intention to temporarily "tune-out" of a PS network, or more specifically, of a RAN connected to a PS network, to perform some desired function. More specifically, the embodiments provide a means by which a UE may indicate which specific serving cells are affected by the tune-out. The UE may perform the tune-out function, for example, to transition to a CS network, or more specifically, to a RAN connected to a CS network, to listen to a paging channel, check paging notifications for incoming calls, or perform a location area update, or to reduce the draw on its battery resources.

Those of ordinary skill in the art should appreciate that, although the present disclosure describes the embodiments in the context of a UE transitioning between a PS network and a CS network, this is merely for illustrative purposes. The methods and procedures described herein are equally applicable to UEs transitioning between an LTE network connected to a PS network and a WiFi network connected to a private or public IP network, such as the Internet, for example.

Figure 1:
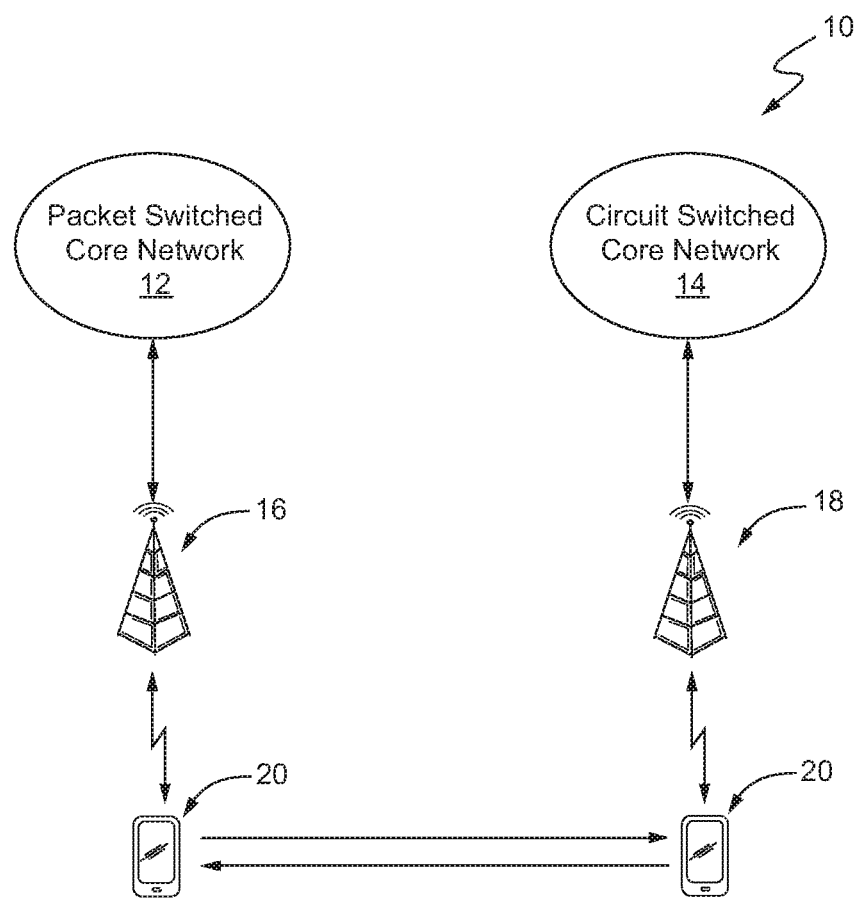
FIG. 1 illustrates a communications system comprising a packet switched (PS) network and a circuit switched (CS) network suitable for use in one embodiment.

Turning to the drawings, FIG. 1 illustrates a high-level, functional block diagram of a communications system 10. As seen in FIG. 1, system 10 comprises a packet switched core network (PSCN) 12 and a circuit switched core network (CSCN) 14. The PSCN 12 connects to a packet data network (PDN), such as the Internet (not shown), and as is known in the art, communicates signals and data with a User Equipment (UE) 20 via a Radio Access Network (RAN) 16, e.g., the Evolved Universal Terrestrial Radio Access Network or E-UTRAN. The RAN 16 may implement any standards known in the art; however, in one embodiment, the RAN 16 conforms to the Long Term Evolution (LTE) protocol and its extensions defined by the Third Generation Partnership Project (3GPP). As known in the art, the RAN 16 includes one or more base stations referred to as eNodeBs (eNB). Each eNB in the RAN 16 provides wireless communication service to a plurality of UEs, such as UE 20, within a geographical area, or cell.

The CSCN 14 comprises a network that connects to a circuit switched network such as the Public Services Telephone Network (PSTN) (not shown). The CSCN 14 provides primarily voice services and low rate data services to the UE 20 over an air interface via one or more base stations (BS) in a RAN 18. The RAN 18 may also operate according to any known standards. However, in one embodiment, the RAN 18 operates according to the well-known IS95/CDMA standards. Thus, the RAN 16 may operate according to one radio access technology and the RAN 18 may operate according to another radio access technology.

The UE 20, having multiple transceivers, may have one of its receivers tuned to the RAN 18, and thus, receive service notifications from the CSCN 14 relating to circuit switched services. For example, in this manner, the UE 20 may receive paging messages alerting the UE 20 to incoming voice calls. Alternatively, if the UE 20 only has a single transceiver or has all of its transceivers tuned to the RAN 16, the UE 20 may, upon registering with the PSCN 12, request that the PSCN 12 forwards circuit services notifications to the UE 20 via RAN 16. Thereafter, whenever the PSCN 12 receives a notification, e.g., an incoming call from the CSCN 14 for the UE 20, the PSCN 12 sends that notification to the UE 20 via the RAN 16. Upon receipt of the notification, the UE 20 may transition to the RAN 18 to communicate with the CSCN 14, and return back to the PSCN 12 and RAN 16 when complete.

Additionally or alternatively, the UE 20 may also need to autonomously transition to the CSCN 14 from time to time to perform some scheduled function, such as read a paging channel or perform a location services update, for example. In these cases, the UE 20 must "tune-out" of the RAN 16 and PSCN 12 and temporarily transition to communicating with the CSCN 14 via RAN 18 to perform the function. However, the UE 20 is currently not required to notify the RAN 16 and/or PSCN 12 when it will transition to the CSCN 14. Such procedures can be problematic because they may cause unexpected behavior in the RAN 16 and/or PSCN 12 networks.

Regardless of whether a given UE 20 has a single transceiver or multiple transceivers, the UE 20 may still have to tune-out of one or more of its serving cells while listening to the CS network if the UE 20 is configured to have all transceivers tuned to the RAN 16, e.g. the LTE network. Even in cases when the UE 20 listens to the LTE network on at least one serving cell and is capable of UL transmissions, there is currently no way for the UE 20 to indicate to the RAN 16 a tune-out of a serving cell in order to communicate with another network, e.g. the CS network. Therefore, a tune-out, even on a secondary cell, could lead to uncontrolled behavior and unnecessary packet losses.

Therefore, according to embodiments of the present invention, a UE such as UE 20 first indicates to the base station, e. g., the eNB, in the RAN 16 that it will temporarily "tune-out" for some period of time. In the indication, the UE 20 identifies which of its serving cells will be affected by the tune-out. Once indicated, the UE 20 may transition from communicating with the RAN 16/PSCN 12 to communicating with the RAN 18/CSCN 14. By way of example, the UE 20 may transition to read a paging channel, check paging notifications for incoming calls, or to perform a location update procedure. Regardless of the reason for the transition, however, the base station or eNB in RAN 16 may temporarily suspend communicating data with the UE 20. When the UE 20 is ready to transition back to the RAN 16/PSCN 12, the UE 20 sends a "tune-in" message to notify its presence to RAN 16. The base station or eNB in RAN 16 then resumes normal operations with the UE 20.

Figure 2:
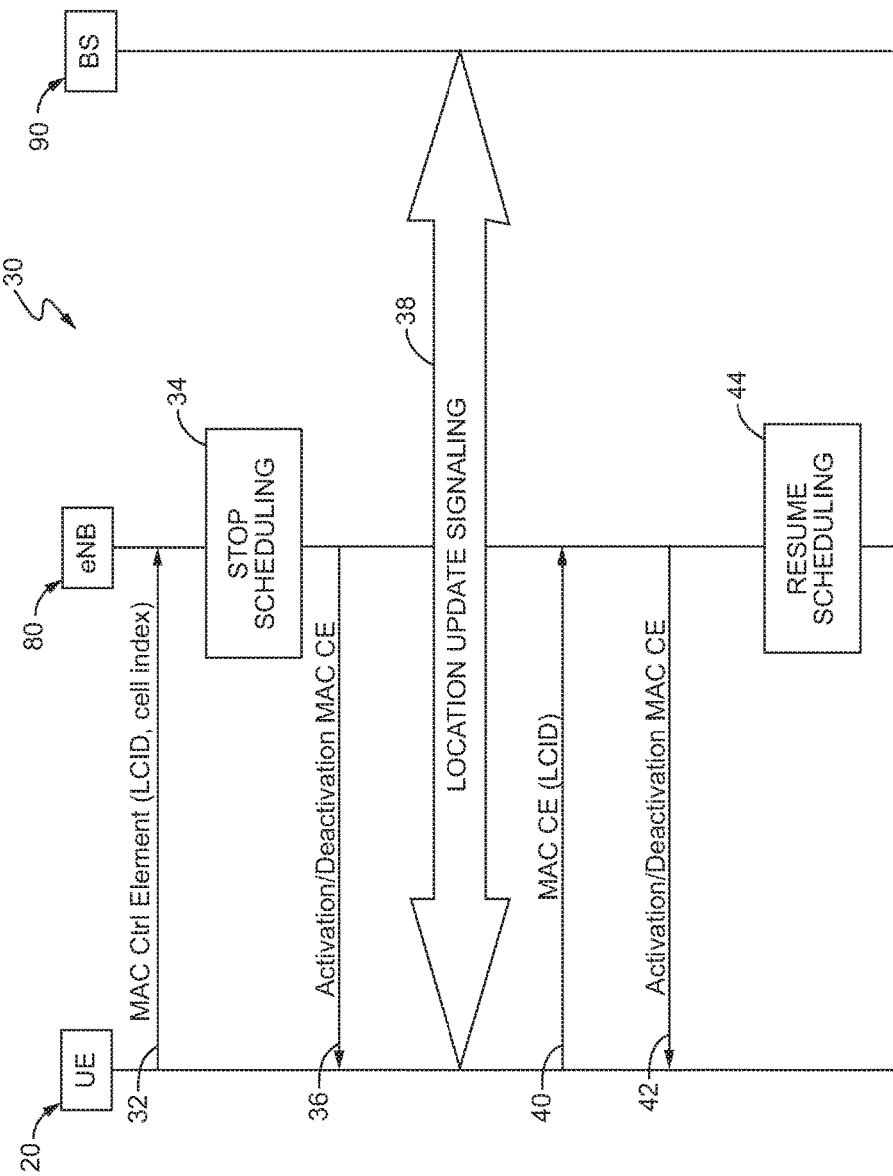
FIG. 2 is a call flow diagram illustrating a tune-out procedure according to one embodiment.

FIG. 2 is a signal diagram illustrating a method 30 of supporting such a transition by the UE 20 from the PSCN 12 to the CSCN 14 and back again. As seen in FIG. 2, the UE 20 first sends a Media Access Control (MAC) Control Element (CE) to the base station, e.g., eNB 80, in RAN 16 to indicate the intention to temporarily tune-out of the RAN 16 and PSCN 12 (line 32). The MAC CE is sent via the uplink shared channel (UL-SCH), and includes, for example, information that identifies the UE 20, the Logical Channel Identifier (LCID), and a cell index that, as described in more detail later, allows the UE 20 to identify which of its serving cells will be affected by the tune-out. Upon receipt of the MAC CE, the base station, e.g., eNB 80, may perform the actions necessary to avoid radio link failure and/or dropped calls for the UE 20. This may include, for example, temporarily stopping the scheduling of the data for the UE 20 (box 34).

The base station or eNB 80 may then send an Activation/Deactivation (A/D) MAC CE to the UE 20 (line 36). The A/D MAC CE is optional, and thus, the base station or eNB 80 may or may not send this message to the UE 20. The UE 20 then transitions from the RAN 16 and PSCN 12 to communicate with the CSCN 14 via a BS 90 in RAN 18 (line 38). As previously stated, the UE 20 may perform a location update function, read a paging channel, check paging notifications for incoming calls, or perform some other function associated with the CSCN 14.

To transition back to the RAN 16 and PSCN 12, i.e., "tune-in", the UE 20 will send another MAC CE including the LCID to the base station or eNB 80 via the Physical Uplink Control Channel (PUCCH) (line 40). As described in more detail later, the UE 20 sends this MAC CE to indicate to the base station or eNB 80 that it is back from the tune-out, and therefore, listening to the base station or eNB 80 on its receivers. The base station or eNB 80 may then (optionally) send another ND MAC CE to the UE 20 (line 42). Particularly, if the base station or eNB 80 deactivated the SCell in a previous ND MAC CE (e.g., line 36), the base station or eNB 80 may activate the SCell in this ND MAC CE when the UE 20 has tuned-in again on the SCell. The base station or eNB 80 can then resume scheduling and normal operations with the UE 20 on the SCell (box 44).

Sending a Tune-Out Message to the Base Station or eNB

Some UEs 20 may be configured to provide a MAC control element to the base station or eNB 80 to signal when it performs a tune-out procedure, thereby enabling the UE 20 to indicate either a one-time, periodic, or a-periodic tune-away or tune-out. Particularly, the UE 20 may send a Scheduling Request (SR) message to the base station or eNB 80 to indicate that it has "tuned back" to RAN 16, e.g. the LTE network. However, when the UE 20 is configured with one or more secondary cells, the UE 20 might still have the receiver tuned to a primary serving cell, e.g., the LTE primary serving cell. In such cases, the base station or eNB 80 may not be able to determine whether a given SR indicates that the UE 20 is requesting to transmit data on its primary serving cell, or whether the UE 20 is indicating that it has "tuned back in" to one or more of its secondary serving cells. Thus, in some cases, the reason for the UE 20 having sent the SR may be ambiguous to the base station or eNB 80.

Therefore, in addition to the foregoing embodiments, embodiments of the present invention also provide a system and method informing a base station, e.g., an eNB 80, of when it will tune-out and/or tune back in. More specifically, embodiments of the present invention configure the 20 to indicate a one-time tune-out, a periodic tune-out, or an a-periodic tune-out. The indications include parameters that indicate, for example, a periodicity for the tune-out, a System Frame Number (SFN), and when the tune-out will occur. Other parameters are also possible.

Embodiments of the present invention also configure the UE 20 to include information of whether the tune-out will impact the UEs 20 Primary Cell (PCell), and/or one or more of the UEs 20 Secondary Cells (SCell) in one or more of the messages previously described.

As seen in more detail below, the embodiments of the present invention may be utilized as stand-alone embodiments, or they may be used to complement other messages or MAC CE(s) configured to provide similar information, and/or in cases where the UE 20 needs to indicate an impact on one or more specific serving cells.

In one embodiment, in a message sent to the base station, e.g., the eNB 80, the UE 20 is configured to indicate that the message applies for one or more specific serving cells. The message may comprise, for example, a MAC CE, and ties the identification of specific serving cells to the tune-out. Thus, in one embodiment, the MAC CE is a tune-out message that indicates which of the cell(s) serving the UE 20 will be impacted by the tune-out.

Figure 5:
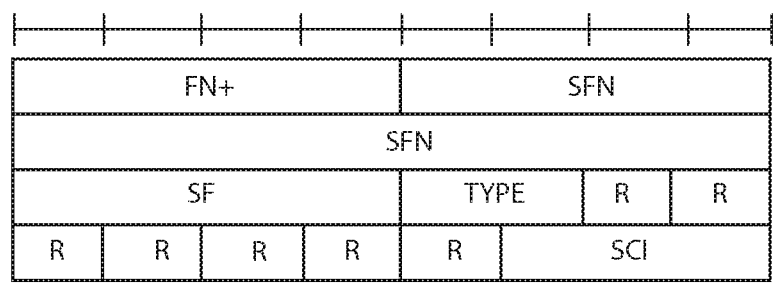
FIG. 5 illustrates a MAC CE implementation of a tune-out message configured according to another embodiment.

In another embodiment, the MAC CE is generated to include a bitmap that indicates which serving cell(s) that are affected. FIGS. 3-5 illustrate some possible exemplary implementations of such a bitmap that indicates the affected serving cells. Those skilled in the art, however, should readily appreciate that the bitmaps and the MAC CEs illustrated in these figures are merely exemplary. To be valid and usable with the embodiments of the present invention, the bitmap does not necessarily have to include the fields shown in the example. Similarly, the illustrated locations of the bitmap in the message are not essential, and thus, are also exemplary and used for illustrative purposes only. The fields seen in the MAC CEs of FIGS. 3-5 may be located in any order and/or could also be located in a MAC CE having a different number of fields or different types of fields than shown in the figures.

FIG. 3 illustrates one exemplary implementation of a MAC CE tune-out message. This embodiment of the MAC CE implements an 8-bit bitmap to indicate which of the serving cells are affected by the tune-out. The 8-bit bitmap corresponds to the cell indices of the SCells and the PCell, which are sometimes, indicated using the terms SCellIndex or ServCellIndex. Although the bitmap is located at the end of the MAC CE, those of ordinary skill in the art should appreciate that the bitmap is not restricted as to its placement within the MAC CE, and may be placed anywhere within the MAC CE or within another, different MAC CE.

The first 7 bits of the bitmap in FIG. 3 correspond to the cell index, e.g., sometimes indicated asSCellIndex, of a secondary serving cell in descending order, where $C_i$ corresponds to cell index i. The last bit of the bitmap, P, corresponds to the PCell. These bits are set to identify which of the serving cell(s) will be affected by the tune-out. Particularly, those serving cell(s) that will be affected by the tune-out are indicated with value of 1 (or alternatively, value 0). All serving cells that are not affected by the tune-out, however, are indicated using the other value (i.e., 0 or 1). For a SCellIndex i that is not in use (i.e. not configured for an SCell), the base station or eNB 80 is configured to ignore the indication.

Therefore, in this embodiment, one possible implementation for defining the bits $C_1$-$C_7$ and P may be as follows.

$C_i$: if there is a SCell configured with SCellIndex i, this field indicates whether the SCell with SCellIndex i is affected by the UE 20 tune-out indicated by this MAC CE. Otherwise, the base station or eNB 80 shall ignore the $C_i$ field. In one embodiment, the $C_i$ field is set to "1" to indicate that the SCell with SCellIndex i is affected by the tune-out, and set to "0" to indicate that the SCell with SCellIndex i is not affected by the tune-out. In another embodiment, the $C_i$ field is set to "0" to indicate that the SCell with SCellIndex i is affected by the tune-out, and set to "1" to indicate that the SCell with SCellIndex i is not affected by the tune-out.

P: This field indicates whether the PCell is affected by the UE 20 tune-out indicated by this MAC CE. In one embodiment, the P field is set to "1" to indicate that the PCell is affected by the tune-out, and set to "0" to indicate that the PCell is not affected by the tune-out. In another embodiment, the P field is set to "0" to indicate that the PCell is affected by the tune-out, and set to "1" to indicate that the PCell is not affected by the tune-out.

FIG. 4 illustrates another exemplary implementation of the MAC CE configured to utilize the same principle as previously described for FIG. 3. Particularly, the embodiment of FIG. 5 also indicates a tune-out impact for one or more SCells, but uses only a 7-bit bitmap $C_1$-$C_7$ rather than an 8-bit bitmap. Particularly, $C_1$-$C_7$ are utilized for indicating the impact (or lack of impact) on an SCell, as described above, but the PCell does not have a separate field. In these embodiments, all 7 bits of the bitmap are set to "0" (or alternatively, "1") to indicate tune-outs that impact the PCell. Thus, in this embodiment, since traffic on SCells is currently not possible without the PCell (as it is needed for PUCCH transmission), a tune-out on the PCell also implicitly defines a tune-out on all configured SCells.

FIG. 5 illustrates an embodiment of the MAC CE structure that may be used either with or without modifications. Particularly, assuming that the "TYPE" field shown in FIG. 5 has at least one unused value, the value, or range of values, is used to indicate that this message is a one-time tune-out message, a periodic tune-out message, or an a-periodic tune-out message that applies to a SCell instead of a the PCell. If the TYPE field is set to another value, or a specific range of values are set, the tune-out message applies for the PCell only.

In another embodiment, the unused value(s) of the TYPE field could also be utilized to indicate to the base station or eNB 80 that the UE 20 has provided information about which SCell(s) it will perform a tune-out on using some or all reserved bits of the MAC CE. This embodiment of using a type value as an indication could be combined with the example implementation using a 7-bit bitmap previously described.

In another embodiment, the TYPE field can be used to indicate whether the UE 20 will or will not tune-out on the PCell. A bitmap, such as the bitmaps seen in FIGS. 3 and 4, for example, can then be used to indicate which SCell(s), if any, that the UE 20 will tune-out on in addition to the PCell.

Sending a Tune-In Message to the Base Station or eNB

In addition to the foregoing embodiments, other embodiments of the present invention provide a method for the UE 20 to indicate to the base station or eNB 80 that it is back from the tune-out, and thus, is listening to the base station or eNB 80 on some or all of its receivers.

Particularly, in one or more embodiments the UE 20 may send a tune-in message to the base station or eNB 80 when the UE 20 has returned to listening to the Radio Access Technology (RAT) that the UE 20 temporarily ceased to monitor. The tune-in message may, for example, correspond to a MAC CE, and may include a MAC subheader having a unique and/or pre-defined LCID value.

In another embodiment, the tune-in message may also contain information that identifies which configured serving cell(s) are no longer affected by the UE's 20 tune-out.

In one embodiment, the tune-in message may correspond to the feedback or response messages sent by the UE 20 to the base station or eNB 80 once the base station or eNB 80 resumes scheduling and normal operations with the UE 20, as previously described.

In one embodiment, the UE 20 sends a tune-in message only if the UE 20 is no longer monitoring another RAT on one or more receivers. In such embodiments, tune-in message may, for example, comprise, a 7 or 8-bit bitmap structured as previously described.

In one embodiment, the UE 20 sends a tune-in message only if the UE 20 is no longer monitoring another RAT on any of its receivers.

Figure 6:
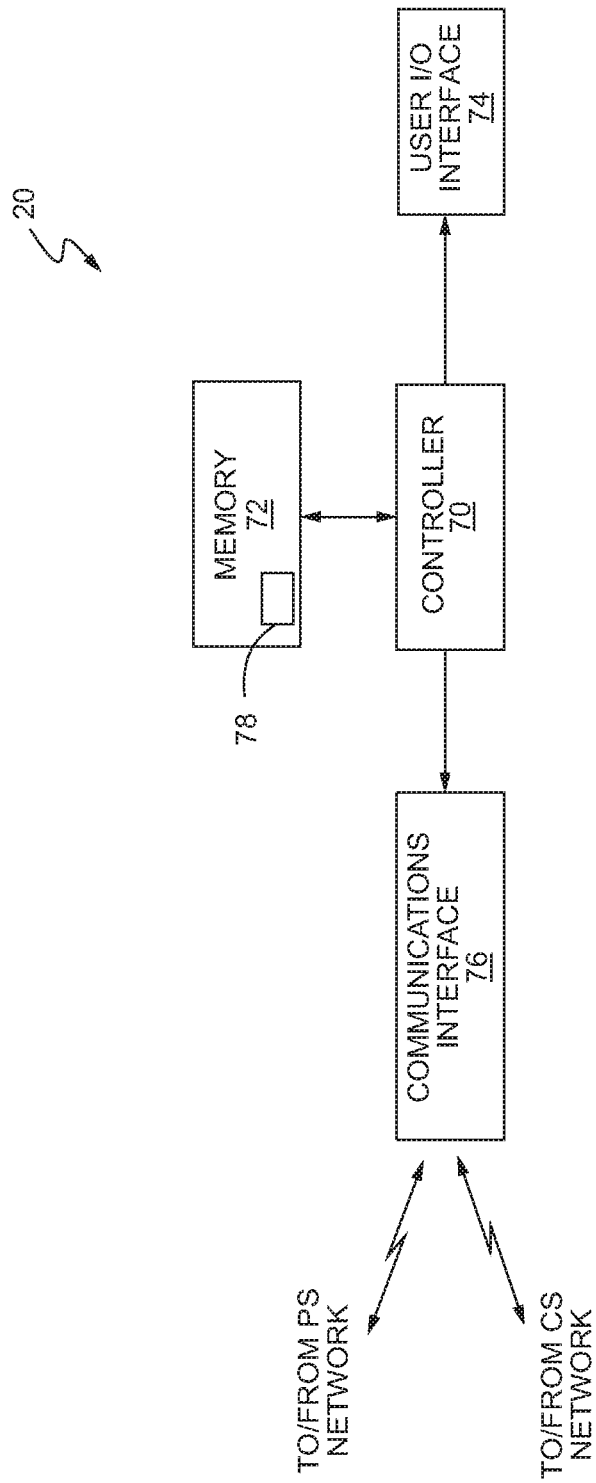
FIG. 6 is a block diagram illustrating some components of a UE configured to initiate a tune-out procedure according to one embodiment.

FIG. 6 is a block diagram illustrating some components of an exemplary UE 20 configured to operate according to one or more embodiments of the present invention. As seen in FIG. 6, UE 20 comprises a programmable controller 70, a memory 72, a user I/O interface 74, and a communications interface 76. The user I/O interface 74 provides the components necessary for a user to interact with the UE 20. The communications interface 76 comprises one or more transceivers that facilitate the communications with the RANs 16, 18, over the respective air interfaces. The memory 72 may comprise any solid state memory or computer readable media known in the art. Suitable examples of such media include, but are not limited to, Read Only Memory (ROM), Dynamic Random Access Memory (DRAM), Flash, or a device capable of reading computer-readable media, such as optical or magnetic media.

The programmable controller 70 may be implemented by one or more microprocessors, hardware, firmware, or a combination thereof, and generally controls the operation of the UE 20 according to the appropriate standards for both the LTE-based RAN 16 and the IS95/CDMA-based RAN 18. Such functions include, but are not limited to, communicating with the base station or eNB 80 to indicate the intention to temporarily "tune-out" of the RAN 16/PSCN 12, as well as to "tune-in" to indicate its return, as previously described in this application. In this regard, the programmable controller 70 may be configured to implement logic and instructions 78 to perform embodiments of the present invention as previously described.

Figure 7:
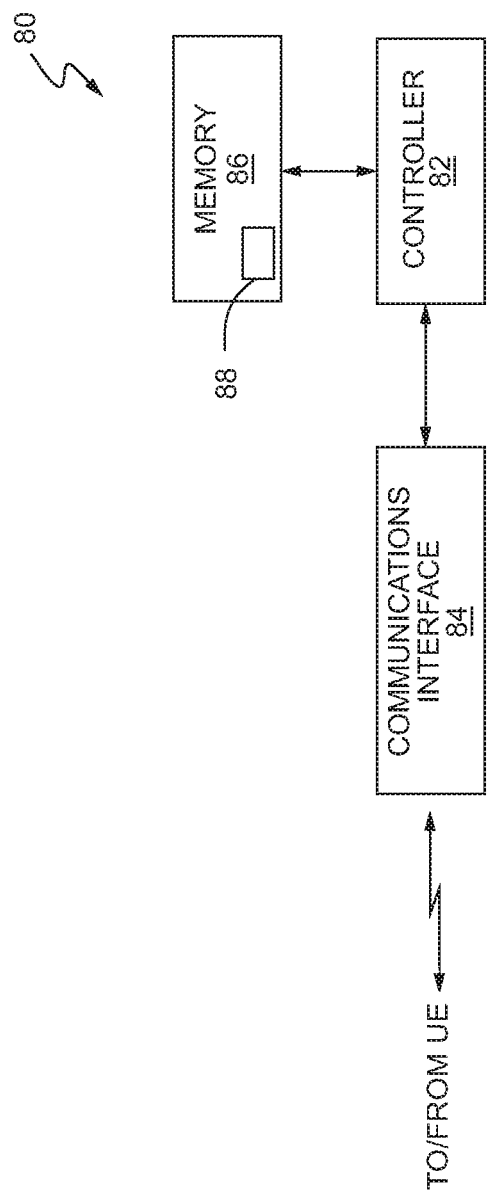
FIG. 7 is a block diagram illustrating some components of an eNB configured to operate according to one embodiment.

FIG. 7 illustrates an exemplary base station or eNB 80 according to one embodiment of the present invention. As shown in FIG. 8, the base station or eNB 80 comprises a programmable controller 82, a communications interface 84, and a memory 86. The communications interface 84 may, for example, comprise a transmitter and receiver configured to operate in an LTE system or other similar system. As is known in the art, the transmitter and receiver are coupled to one or more antennas (not shown) and communicate with the UE 20 over the LTE-based air interface. Memory 86 may comprise any solid state memory or computer readable media known in the art. Suitable examples of such media include, but are not limited to, ROM, DRAM, Flash, or a device capable of reading computer-readable media, such as optical or magnetic media.

The programmable controller 82 controls the operation of the base station or eNB 80 in accordance with the LTE standard. The functions of the controller 82 may be implemented by one or more microprocessors, hardware, firmware, or a combination thereof, and include performing the functions to grant and support the temporary tune-outs requested by the UE 20. Thus, the controller 82 may be configured to according to logic and instructions 88 stored in memory 86 to communicate the MAC Control Elements with the UE 20, as well as to suspend scheduling and other functions regarding the UE 20 to avoid radio link failure and dropped calls while the UE 20 is tuned out of the RAN 16/PSCN 12.

The embodiments of the present invention provide advantages and benefits not realized by conventional systems and methods. For example, the present embodiments provide a solution in which the base station or eNB 80 is not only aware of when the UE 20 tunes-out, but also on which serving cells (if multiple) as well as when the UE 20 ends the tune-out or tunes back in. Additionally, the present embodiments enable the UE 20 to indicate that it will tune-out on one or more serving cells, as well as to indicate that it has tuned-in, even if the UE 20 was only tuned-out on a subset of its configured serving cells.

Figure 8A:
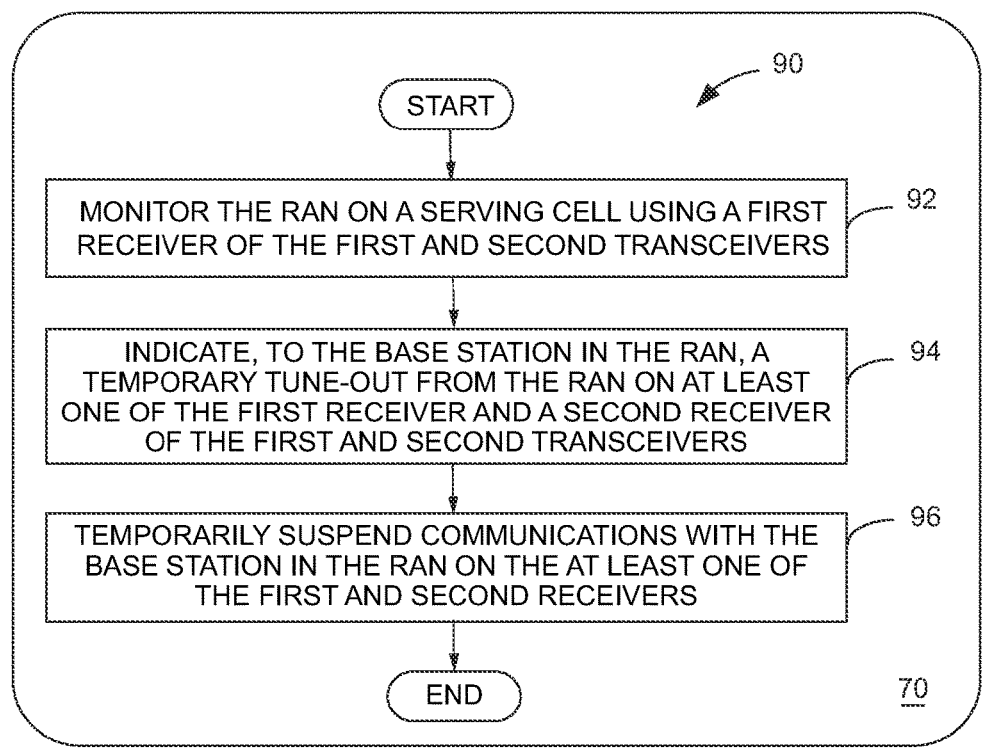
FIGS. 8A-8C are flow diagrams illustrating methods for performing embodiments of the present disclosure by a programmable controller at a UE.
Figure 8B:
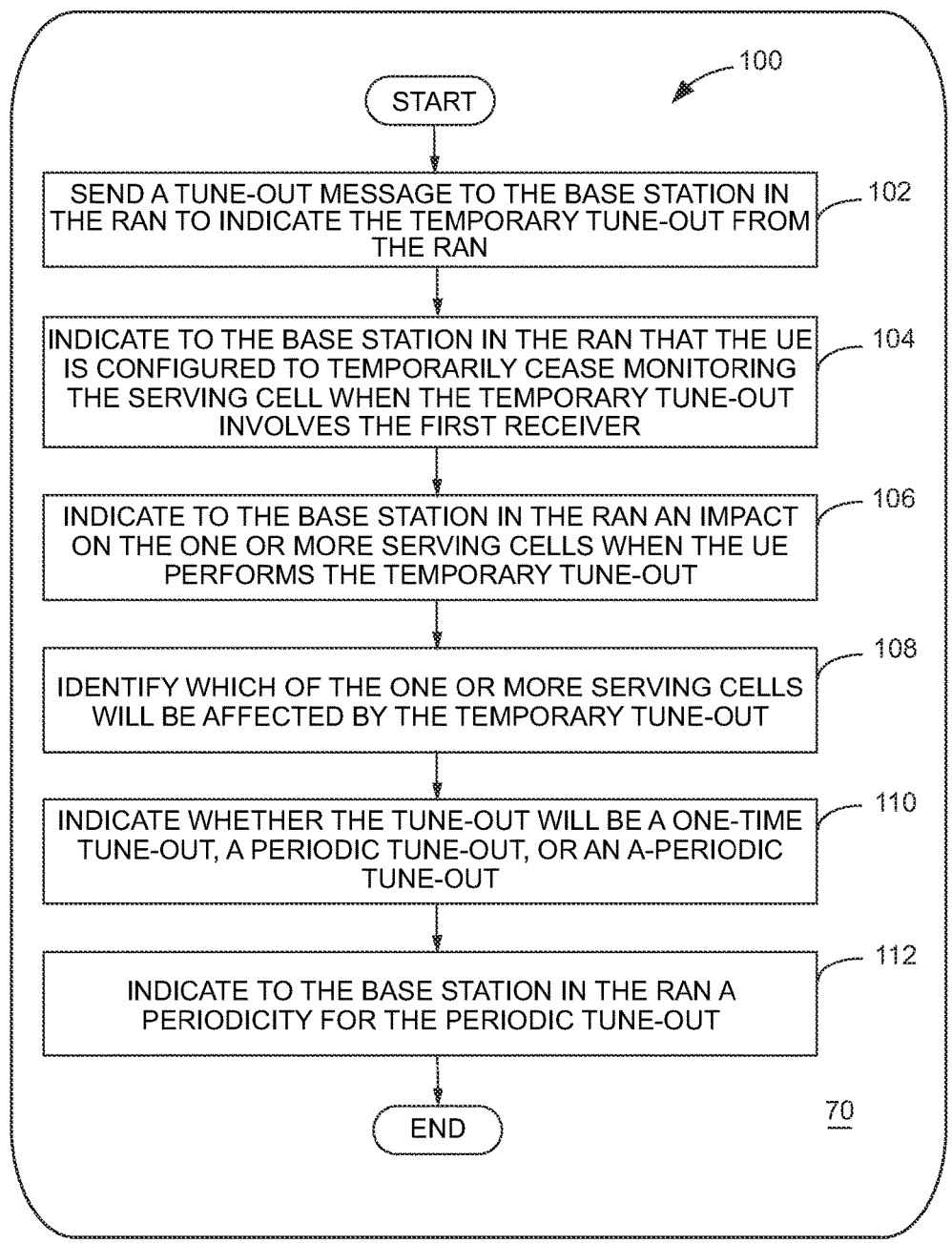
Figure 8C:
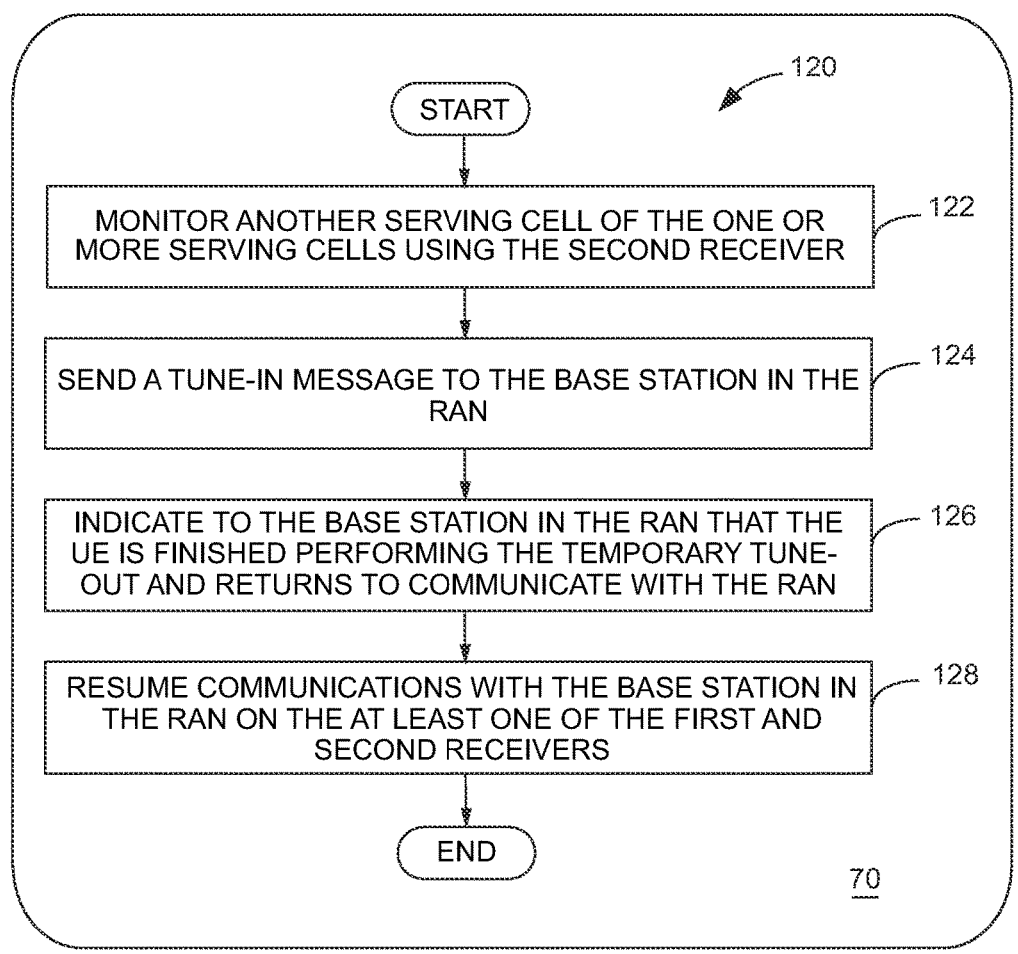

FIGS. 8A-8C are flow diagrams illustrating methods 90, 100, and 120, respectively, for controlling communications between the UE 20 and a base station or eNB 80 in a radio access network RAN 16. In this embodiment, the UE 20 comprises, for illustrative purposes, first and second transceivers. Each transceiver includes a corresponding receiver configured to communicate on respective first and second carriers. Additionally, the UE 20 is configured with one or more serving cells for communicating with the RAN 16. The methods 90, 100, and 120 are all performed at the UE 20 by the programmable controller 70.

FIG. 8A is a flow diagram illustrating a method 90 according to one embodiment wherein the programmable controller 70 of UE 20 controls communications between the UE 20 and the base station or eNB 80 in a radio access network RAN 16. Method 90 begins with the programmable controller 70 monitoring the RAN 16 on a specific serving cell, of the one or more serving cells, using a first receiver of the first and second transceivers (box 92). To temporarily suspend communications with the base station or eNB 80, the programmable controller at UE 20 indicates to the base station or eNB 80 in RAN 16 a temporary tune-out from the RAN 16 on at least one of the first receiver and a second receiver of the first and second transceivers (box 94). Once the indication is sent, the programmable controller 70 temporarily suspends communications with the base station or eNB 80 in RAN 16 on the at least one of the first and second receivers (box 96). In some embodiments, the programmable controller 70 at UE 20 may temporarily suspend the communications responsive to receiving an acknowledgement message from the base station or eNB 80.

FIG. 8B is a flow diagram illustrating a method 100 of how the programmable controller 70 at the UE 20 may be configured to indicate the intention to tune-out of the RAN 16 according to embodiments of the present disclosure. Particularly, as seen in method 100, the programmable controller 70 may send a tune-out message to the base station or eNB 80 in the RAN 16 to indicate the temporary tune-out from the RAN 16 (box 102). The tune-out message may include any information needed or desired, but in one embodiment, the tune-out message includes information that indicates one or more of a UE 20 identifier, a Logical Channel Identifier (LCID), a cell index that identifies which of the one or more serving cells will be affected by the temporary tune-out, a System Frame Number (SFN), and a time that the tune-out will occur.

In one embodiment, when the temporary tune-out involves the first receiver, the programmable controller 70 may indicate to the base station or eNB 80 in RAN 16 that the UE 20 is configured to temporarily cease monitoring the specific serving cell (box 104). In another embodiment, the programmable controller 70 may indicate to the base station or eNB 80 in the RAN 16, an impact on the one or more serving cells when the UE 20 performs the temporary tune-out (box 106). In such embodiments, the programmable controller 70 may identify which of the one or more serving cells will be affected by the temporary tune-out (box 108). Additionally or alternatively, the programmable controller 70 at the UE 20 may, in one embodiment, indicate whether the tune-out will be a one-time tune-out, a periodic tune-out, or an a-periodic tune-out (box 110). In embodiments where the tune-out is a periodic tune-out, the programmable controller 70 at the UE 20 may indicate a periodicity for the periodic tune-out (box 112).

FIG. 8C is a flow diagram illustrating a method 120 in which the programmable controller 70 controls the UE 20 to resume communications with the RAN 16. As seen in FIG. 8C, the UE 20 may monitor, or may already be monitoring, another serving cell of the one or more serving cells using the second receiver (box 122). Regardless, however, the programmable controller 70 sends a tune-in message to the base station or eNB 80 in RAN 16 via a Physical Uplink Control Channel (PUCCH) to indicate that the UE 20 is once again monitoring the RAN (16) on at least one of the specific serving cell and the another serving cell (box 124). The tune-in message may comprise any information needed or desired, but in one embodiment, the tune-in message comprises one or more of a Logical Channel Identifier (LCID) and a cell index identifying which of the one or more serving cells will no longer be affected by the temporary tune-out. More specifically, the programmable controller 70 may indicate to the base station or eNB 80 in the RAN 16, that the UE 20 is finished performing the temporary tune-out and returns to communicate with the RAN 16 (box 126). The programmable controller 70 then resumes communications with the base station or eNB 80 in the RAN 16 on the at least one of the first and second receivers (box 128).

Figure 9A:
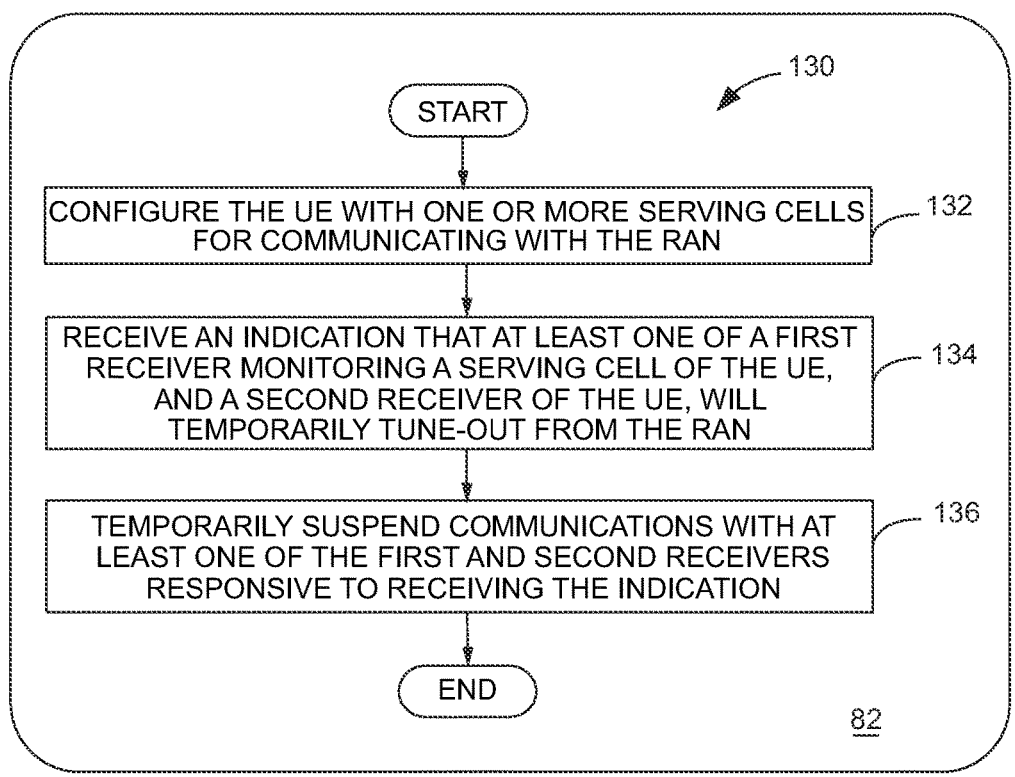
FIGS. 9A-9B are flow diagrams illustrating methods for performing embodiments of the present disclosure by a programmable controller at a base station.
Figure 9B:
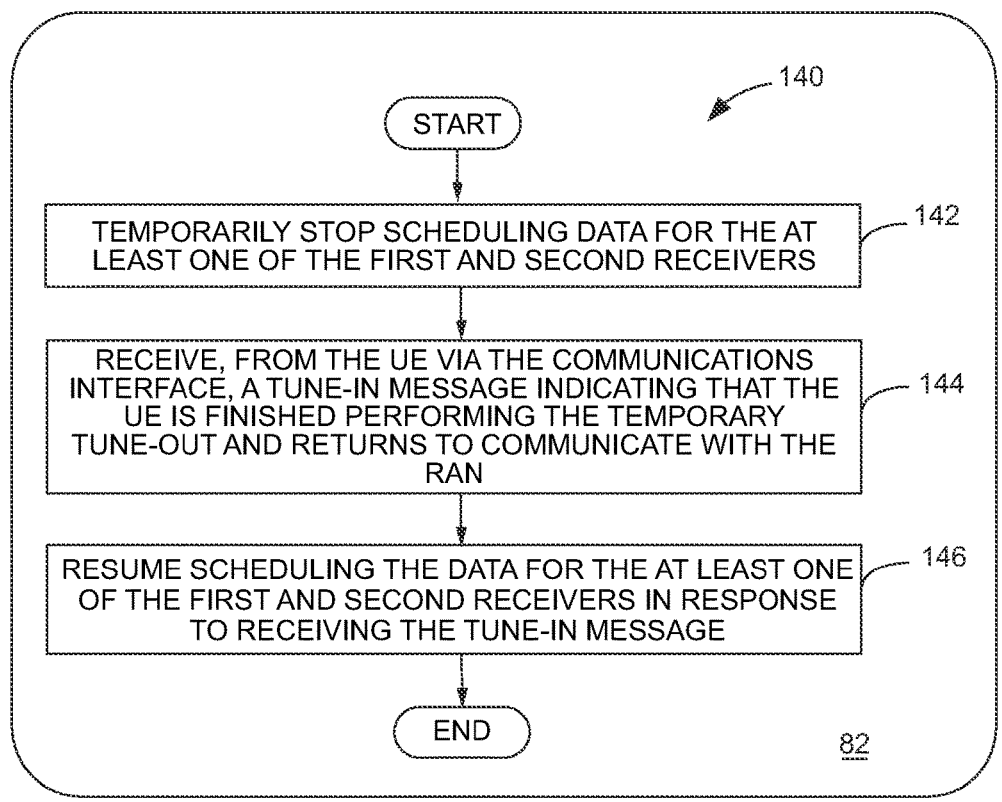

FIGS. 9A-9B are flow diagrams illustrating methods 130 and 140 respectively, for controlling communications between the UE 20 and a base station, e.g., eNB 80, in RAN 16. The methods 130 and 140 are all performed at the base station, e.g., eNB 80, in RAN 16 by the programmable controller 82.

FIG. 9A is a flow diagram illustrating a method 130 wherein the programmable controller 82 of base station or eNB 80 controls communications between the UE 20 and the base station or eNB 80 in a radio access network RAN 16. As seen in method 130, the base station or eNB 80 configures the UE 20 with one or more serving cells for communicating with the RAN 16 (box 132). The programmable controller 82 at the base station or eNB 80 then receives, from the UE 20, an indication that at least one of a first receiver of the UE 20 monitoring a specific serving cell of the one or more serving cells, and a second receiver of the UE 20, will temporarily tune-out from the RAN 16 (box 134). Responsive to receiving the indication from the UE 20, the programmable controller 82 temporarily suspends communications with at least one of the first and second receivers (box 136). In some embodiments, the programmable controller 82 at the base station or eNB 80 may send an acknowledgement to the UE 20 upon receiving the tune-out message.

FIG. 9B illustrates a method 140 wherein the programmable controller 82 at base station or eNB 80 resumes communications with the UE 20 according to another embodiment. Particularly, in this embodiment, the programmable controller 82 at the base station or eNB 80 temporarily stops scheduling data for the at least one of the first and second receivers (box 142) to suspend communications with the at least one of the first and second receivers. Thereafter, the base station or eNB 80 receives a tune-in message indicating that the UE 20 is finished performing the temporary tune-out and returns to communicate with the RAN 16 (box 144). In response to receiving the tune-in message, the programmable controller 82 resumes scheduling data for the at least one of the first and second receivers (box 146). In some embodiments, the programmable controller 82 at the base station or eNB 80 may also send an acknowledgement to the UE 20 upon receiving the tune-in message.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

We claim:

1. A method, performed by a User Equipment, UE, for controlling communications between the UE and a base station in a radio access network, RAN, the UE comprising first and second transceivers, each having a corresponding receiver, the UE configured with one or more serving cells for communicating with the RAN, the method comprising:
    monitoring the RAN on a specific serving cell of said one or more serving cells using a first receiver of the first and second transceivers; and
    sending a tune-out message to the base station in the RAN, the message configured to:
        indicate, to the base station, a temporary tune-out from the RAN on at least one of the first receiver and a second receiver of the first and second transceivers; and
        indicate, to the base station, an impact on the one or more serving cells when the UE performs the temporary tune-out; and
        identify which of the one or more serving cells will be affected by the temporary tune-out.

2. The method of claim 1 further comprising temporarily suspending communications with the base station in the RAN on the at least one of the first and second receivers.

3. The method of claim 1 wherein indicating the temporary tune-out from the RAN comprises indicating, by the UE to the base station in the RAN, that the UE is configured to temporarily cease monitoring the specific serving cell when the temporary tune-out involves the first receiver.

4. The method of claim 1 wherein indicating the temporary tune-out from the RAN comprises indicating whether the tune-out will be one of a one-time tune-out, a periodic tune-out, or an a-periodic tune-out.

5. The method of claim 4 wherein if the tune-out comprises a periodic tune-out, indicating the temporary tune-out from the RAN further comprises indicating to the base station in the RAN a periodicity for the periodic tune-out.

6. The method of claim 1 wherein the tune-out message includes information that indicates one or more of a UE identifier, a Logical Channel Identifier, LCID, a cell index that identifies which of the one or more serving cells will be affected by the temporary tune-out, a System Frame Number, SFN, and a time that the tune-out will occur.

7. The method of claim 1 further comprising:
indicating, to the base station in the RAN, that the UE is finished performing the temporary tune-out and returns to communicate with the RAN; and
resuming communications with the base station in the RAN on the at least one of the first and second receivers.

8. The method of claim 7 further comprising monitoring another serving cell of the one or more serving cells using the second receiver, and wherein indicating to the base station in the RAN that the UE is finished performing the temporary tune-out and returns to communicate with the RAN comprises sending a tune-in message to the base station in the RAN via a Physical Uplink Control Channel, PUCCH, to indicate that the UE is once again monitoring the RAN on at least one of the specific serving cell and the another serving cell, the tune-in message including one or more of a Logical Channel Identifier, LCID, and a cell index identifying which of the one or more serving cells will no longer be affected by the temporary tune-out.

9. A User Equipment (UE) configured to control communications between the UE and a base station in a radio access network, RAN, the UE configured with one or more serving cells for communicating with the RAN and comprising:
a communication interface comprising a plurality of transceivers, each transceiver having a corresponding receiver and configured to communicate with the RAN via base station; and
a programmable processing circuit operatively connected to the plurality of transceivers, and configured to:
monitor the RAN on a specific serving cell of the one or more serving cells using a first receiver of the first and second transceivers; and
send a tune-out message to the base station in the RAN, the tune-out message configured to:
indicate a temporary tune-out from the RAN on at least one of the first receiver and a second receiver of the first and second transceivers;
indicate to the base station in the RAN, an impact on the one or more serving cells when the UE performs the temporary tune-out; and
identify which of the one or more serving cells will be affected by the temporary tune-out.

10. The UE of claim 9 wherein the programmable processing circuit is further configured to temporarily suspend communications with the base station in the RAN on the at least one of the first and second receivers.

11. The UE of claim 9 wherein to indicate the temporary tune-out from the RAN, the programmable processing circuit is further configured to indicate to the base station in the RAN that the UE is configured to temporarily cease monitoring the specific serving cell when the temporary tune-out involves the first receiver.

12. The UE of claim 9 wherein to indicate the temporary tune-out from the RAN, the programmable processing circuit is further configured to indicate whether the tune-out will be one of a one-time tune-out, a periodic tune-out, or an a-periodic tune-out.

13. The UE of claim 12 wherein if the tune-out comprises a periodic tune-out, the programmable processing circuit is further configured to indicate to the base station in the RAN a periodicity for the periodic tune-out.

14. The UE of claim 9 wherein the tune-out message includes information that indicates one or more of a UE identifier, a Logical Channel Identifier, LCID, a cell index that identifies which of the one or more serving cells will be affected by the temporary tune-out, a System Frame Number, SFN, and a time that the tune-out will occur.

15. The UE of claim 9 wherein the programmable controller processing circuit is further configured to:
indicate, to the base station in the RAN, that the UE is finished performing the temporary tune-out and returns to communicate with the RAN; and
resume communications with the base station in the RAN on the at least one of the first and second receivers.

16. The UE of claim 15 wherein the programmable processing circuit is further configured to monitor another serving cell of the one or more serving cells using the second receiver, and wherein to indicate to the base station in the RAN that the UE is finished performing the temporary tune-out and returns to communicate with the RAN, the programmable processing circuit is further configured to send a tune-in message to the base station in the RAN via a Physical Uplink Control Channel, PUCCH, to indicate that the UE is once again monitoring the RAN on at least one of the specific serving cell and the another serving cell, the tune-in message including one or more of a Logical Channel Identifier, LCID, and a cell index identifying which of the one or more serving cells will no longer be affected by the temporary tune-out.

17. A method for controlling communications between a User Equipment (UE) and a base station in a radio access network, RAN, the method performed by the base station and comprising:
configuring the UE with one or more serving cells for communicating with the RAN; and
receiving, from the UE, a tune-out message configured to:
indicate, to the base station, that at least one of a first receiver of the UE monitoring a specific serving cell of the one or more serving cells, and a second receiver of the UE, will temporarily tune-out from the RAN;
indicate, to the base station in the RAN, an impact on the one or more serving cells when the UE performs the temporary tune-out; and
identify, to the base station, which of the one or more serving cells will be affected by the temporary tune-out.

18. The method of claim 17 further comprising temporarily suspending communications to the at least one of the first and second receivers responsive to receiving the indication.

19. The method of claim 18 wherein temporarily suspending communications to the at least one of the first and second receivers comprises temporarily stopping scheduling of data for the at least one of the first and second receivers at the base station in the RAN.

20. The method of claim 18 further comprising:
receiving, from the UE, a tune-in message indicating that the UE is finished performing the temporary tune-out and returns to communicate with the RAN; and
resuming scheduling of data for the at least one of the first and second receivers responsive to receiving the tune-in message from the UE.

21. The method of claim 17 further comprising sending an acknowledgement message to the UE responsive to receiving one or both of the tune-out and tune-in messages from the UE.

22. A base station in a radio access network, RAN, configured to control communications between a User Equipment (UE) and the base station, the base station comprising:

a communication interface configured to communicate with a UE; and a programmable processing circuit operatively connected to the communication interface and configured to:
  configure the UE with one or more serving cells for communicating with the RAN; and
  receive, from the UE, a tune-out message configured to:
    indicate, to the base station, that at least one of a first receiver of the UE monitoring a specific serving cell of the one or more serving cells, and a second receiver of the UE, will temporarily tune-out from the RAN;
    indicate, to the base station, an impact on the one or more serving cells when the UE performs the temporary tune-out; and
    identify, to the base station, which of the one or more serving cells will be affected by the temporary tune-out.

23. The base station of claim 22 wherein the programmable processing circuit is further configured to temporarily suspend communications to the at least one of the first and second receivers responsive to receiving the indication.

24. The base station of claim 23 wherein to temporarily suspend communications to the at least one of the first and second receivers, the programmable processing circuit is further configured to temporarily stop scheduling data for the at least one of the first and second receivers.

25. The base station of claim 22 wherein the programmable processing circuit is further configured to receive, from the UE via the communications interface, a tune-in message indicating that the UE is finished performing the temporary tune-out and returns to communicate with the RAN, and wherein in response to receiving the tune-in message from the UE, the programmable processing circuit is further configured to resume scheduling data for the at least one of the first and second receivers.

26. The base station of claim 22 wherein the programmable processing circuit is further configured to send, via the communications interface, an acknowledgement message to the UE responsive to receiving one or both of the tune-out and tune-in messages from the UE.

* * * * *